United States Patent
Lu

(10) Patent No.: US 8,218,315 B2
(45) Date of Patent: Jul. 10, 2012

(54) MOUNTING APPARATUS FOR STORAGE DEVICE

(75) Inventor: Hung-Chun Lu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 263 days.

(21) Appl. No.: 12/551,451

(22) Filed: Aug. 31, 2009

(65) Prior Publication Data

US 2010/0270450 A1   Oct. 28, 2010

(30) Foreign Application Priority Data

Apr. 25, 2009   (CN) .......................... 2009 1 0301838

(51) Int. Cl.
*G06F 1/16*   (2006.01)
*H05K 5/00*   (2006.01)
*H05K 7/00*   (2006.01)

(52) U.S. Cl. ......... 361/679.58; 361/679.33; 361/679.31; 361/379.37; 361/679.39; 361/379.8; 312/319.1; 312/333

(58) Field of Classification Search ............. 361/679.33, 361/679.31, 679.37, 679.38, 679.39, 679.32, 361/679.34, 679.35, 679.36, 679.4, 649.58; 312/319.1, 333; 248/221.11, 222.11, 222.12, 248/222.51

See application file for complete search history.

(56) References Cited

U.S. PATENT DOCUMENTS

| | | | | |
|---|---|---|---|---|
| 4,896,777 A * | 1/1990 | Lewis | ...................... | 211/41.17 |
| 5,652,695 A * | 7/1997 | Schmitt | ................... | 361/679.31 |
| 5,741,055 A * | 4/1998 | Chen | ......................... | 312/348.6 |
| 5,751,551 A * | 5/1998 | Hileman et al. | .............. | 361/753 |
| 5,825,615 A * | 10/1998 | Ohara | ........................ | 361/679.6 |
| 6,018,457 A * | 1/2000 | Mroz | ....................... | 361/679.31 |
| 6,064,567 A * | 5/2000 | Cheng | ...................... | 361/679.31 |
| 6,122,165 A * | 9/2000 | Schmitt et al. | ........... | 361/679.31 |
| 6,130,817 A * | 10/2000 | Flotho et al. | ............. | 361/679.31 |
| 6,351,379 B1 * | 2/2002 | Cheng | ...................... | 361/679.33 |
| 6,836,406 B2 * | 12/2004 | Weng et al. | .............. | 361/679.38 |
| 6,848,662 B2 * | 2/2005 | Paramonoff et al. | ...... | 248/309.1 |
| 6,853,549 B2 * | 2/2005 | Xu | .......................... | 361/679.39 |
| 6,882,527 B2 * | 4/2005 | Wang et al. | ............. | 361/679.31 |
| 6,999,308 B2 * | 2/2006 | Hsu | .......................... | 361/679.33 |
| 7,035,099 B2 * | 4/2006 | Wu | ........................... | 361/679.33 |
| 7,092,249 B2 * | 8/2006 | Wang | ....................... | 361/679.33 |
| 7,137,767 B2 * | 11/2006 | Franke et al. | ................ | 411/401 |
| 7,226,138 B2 * | 6/2007 | Katagiri | ..................... | 312/319.1 |
| 7,254,018 B2 * | 8/2007 | Zhang et al. | ............. | 361/679.33 |
| 7,423,869 B2 * | 9/2008 | Su | ............................ | 361/679.33 |
| 7,443,668 B2 * | 10/2008 | Hsu | ......................... | 361/679.33 |
| 7,489,504 B2 * | 2/2009 | Chen et al. | ............... | 361/679.37 |
| 7,495,903 B2 * | 2/2009 | Chen et al. | ............... | 361/679.31 |
| 7,518,858 B2 * | 4/2009 | Takahashi et al. | ........ | 361/679.33 |
| 7,540,574 B2 * | 6/2009 | Wu et al. | ..................... | 312/223.2 |
| 7,549,552 B2 * | 6/2009 | Hasegawa et al. | ............ | 220/323 |

(Continued)

*Primary Examiner* — Terrell McKinnon
*Assistant Examiner* — Michael McDuffie
(74) *Attorney, Agent, or Firm* — Altis Law Group, Inc.

(57) ABSTRACT

A mounting apparatus for fixing a storage device to a chassis defining an opening includes two opposite fixing arms for supporting the storage device, a main body connecting the fixing arms, a latching member pivotably received in the main body, and an operating member slidably coupled to the main body. When the mounting apparatus is received in the chassis through the opening, and the operating member is pushed to drive the latching member to rotate, the latching portion protrudes outwardly from the main body and engages with an inside surface adjoining the opening of the chassis.

14 Claims, 6 Drawing Sheets

U.S. PATENT DOCUMENTS

| | | | |
|---|---|---|---|
| 7,667,960 B2 * | 2/2010 | Miyairi | 361/679.34 |
| 7,697,279 B2 * | 4/2010 | Yeh et al. | 361/679.39 |
| 7,755,886 B2 * | 7/2010 | Peng et al. | 361/679.33 |
| 7,782,606 B2 * | 8/2010 | Baker et al. | 361/679.39 |
| 7,796,380 B2 * | 9/2010 | Lee | 361/679.33 |
| 7,911,777 B2 * | 3/2011 | Fan et al. | 361/679.36 |
| 7,916,465 B2 * | 3/2011 | Chen | 361/679.39 |
| 7,944,687 B2 * | 5/2011 | Walker et al. | 361/679.37 |
| 2003/0030992 A1 * | 2/2003 | Kim et al. | 361/725 |
| 2003/0058612 A1 * | 3/2003 | Liu et al. | 361/685 |
| 2005/0280982 A1 * | 12/2005 | Yang | 361/684 |
| 2006/0023413 A1 * | 2/2006 | Lo et al. | 361/684 |
| 2006/0193111 A1 * | 8/2006 | Han | 361/683 |
| 2006/0273052 A1 * | 12/2006 | Chen | 211/26 |
| 2007/0053150 A1 * | 3/2007 | Lee et al. | 361/685 |
| 2007/0297129 A1 * | 12/2007 | Liu et al. | 361/685 |
| 2008/0062635 A1 * | 3/2008 | Chang | 361/685 |
| 2008/0316698 A1 * | 12/2008 | Yeh et al. | 361/685 |

\* cited by examiner

MOUNTING APPARATUS FOR STORAGE DEVICE

BACKGROUND

1. Technical Field

The present disclosure relates to mounting apparatuses, and particularly, to a mounting apparatus for a storage device.

2. Description of Related Art

Typically, a solid state disk is directly fixed into a computer chassis. To detach the solid state disk, the computer chassis must be taken apart, which is troublesome.

DETAILED DESCRIPTION

Figure 1:
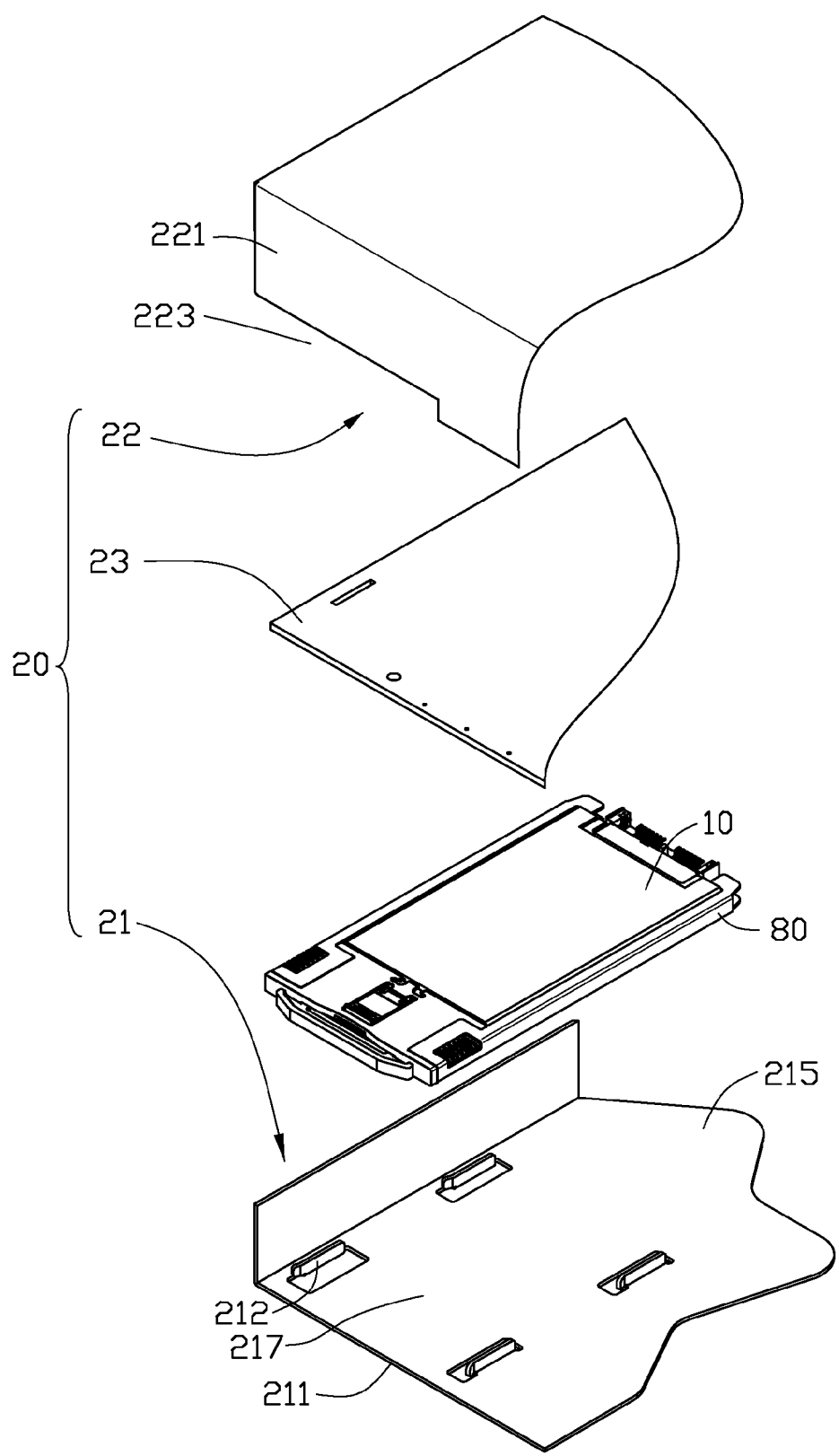
FIG. 1 is an exploded, isometric view of an embodiment of a mounting apparatus together with a storage device and a chassis.
Figure 2:
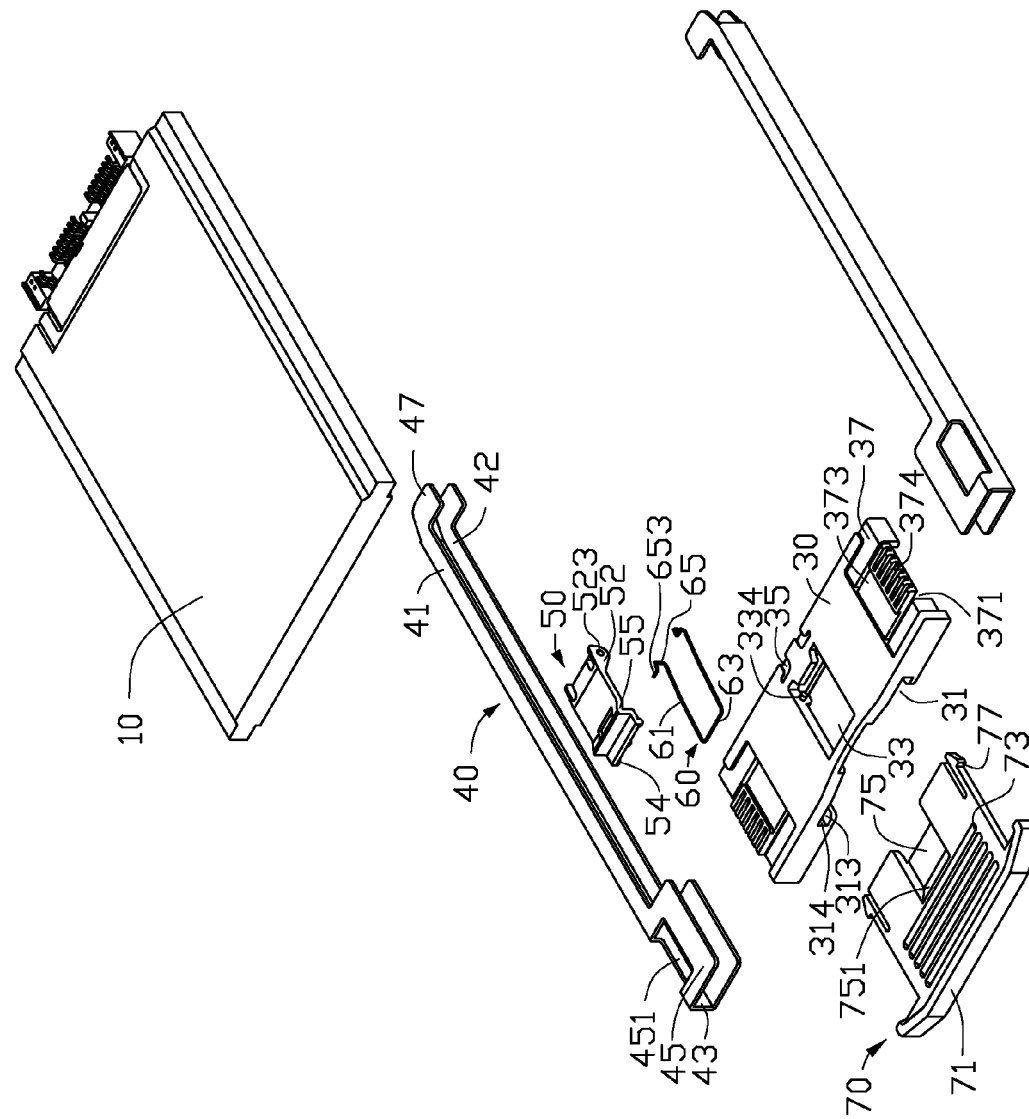
FIG. 2 is an exploded, isometric view of the mounting apparatus and the storage device of FIG. 1.
Figure 3:
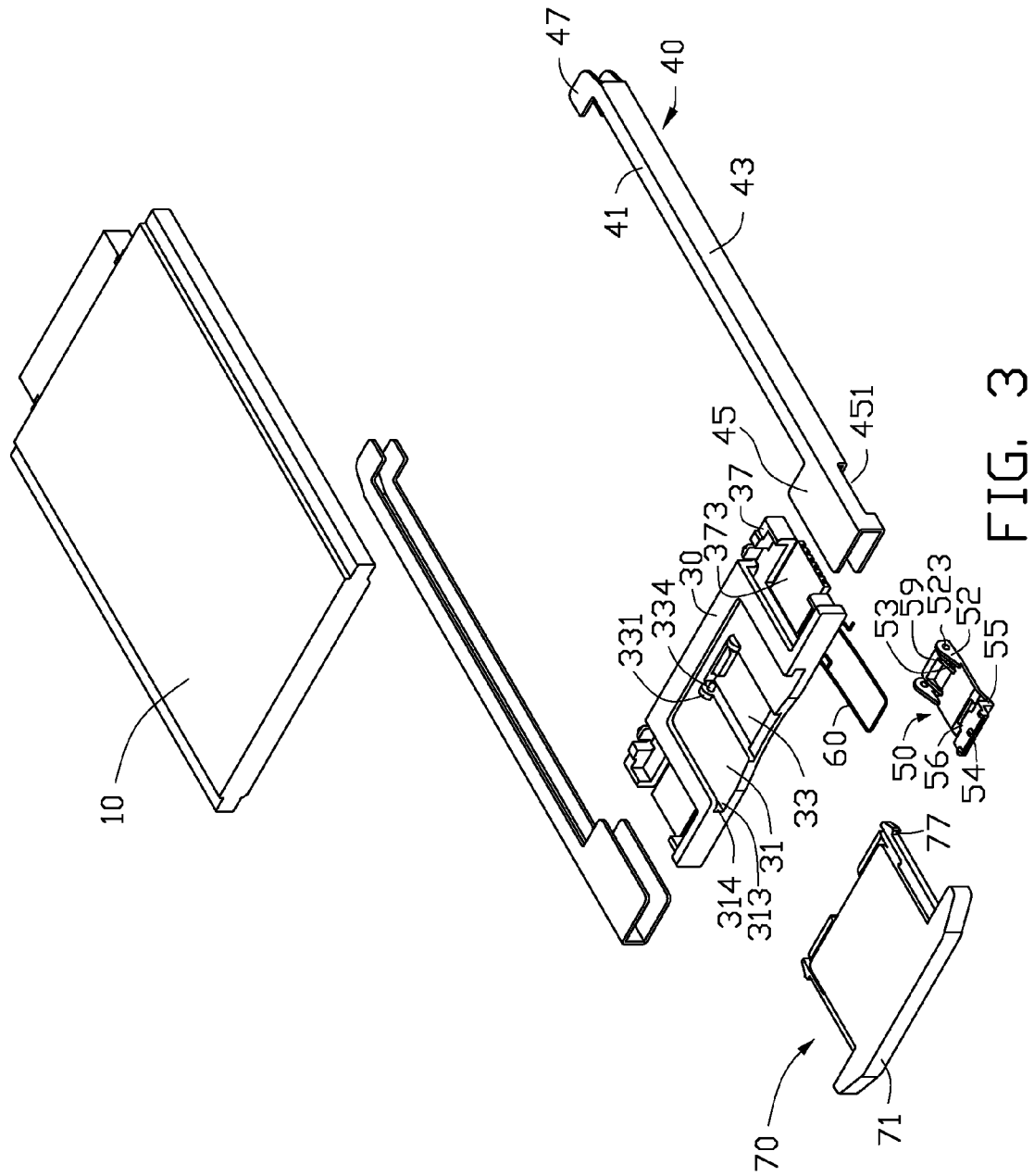
FIG. 3 is an inverted view of FIG. 2.

Referring to FIGS. 1 to 3, an embodiment of a mounting apparatus 80 for fixing a storage device 10 into a chassis 20 of an electronic device includes a main body 30, two fixing arms 40, a latching member 50, a resilient member 60, and an operating member 70. In this embodiment, the storage device 10 is a solid state disk.

The chassis 20 includes a base 21, a cover 22 covering the base 21, and a motherboard 23 installed between the base 21 and the cover 22. The base 21 includes a bottom plate 215 having an end edge 211. Two pairs of guiding plates 212, perpendicular to the end edge 211, protrude from the bottom plate 215, and form a receiving space between the pairs of guiding plates 212. The cover 22 includes a sidewall 221 perpendicularly connected to the end edge 211 of the bottom plate 215. An opening 223 is defined in a lower portion of the sidewall 221.

A recess 31 is defined in a middle of a bottom of the main body 30, with a side of the recess 31 extending through a front edge of the main body 30. Each of two opposite walls bounding the recess 31, which are perpendicularly connected to the front edge of the main body 30, defines an elongated sliding slot 313, and forms a block 314 in the sliding slot 313 adjacent to the front edge of the main body 30. An aperture 33 in communication with the recess 31 is defined in the main body 30 through a top of the main body 30 and a bottom of the recess 31. Two tabs 331 correspondingly extend down from two portions bounding the aperture 33 adjacent to a rear end of the aperture 33. A pivot 334 protrudes from each tab 331 towards the aperture 33. Two spaced L-shaped grooves 35 are defined in the top of the main body 30, with an end of each groove 35 extending through a rear edge of the main body 30. Two concave engaging areas 37 are correspondingly defined in opposite ends of the main body 30. Two spaced slots 371 are defined in each engaging area 37, such that a resilient tab 373 is formed between the slots 371 on each end of the main body 30. An engaging portion 374 extends from a top of each resilient tab 373.

Each fixing arm 40 includes a top wall 41, a bottom wall 42, and a connecting wall 43 perpendicularly connected between the top wall 41 and the bottom wall 42. An engaging tab 45 is formed on a front end of each of the top wall 41 and bottom wall 42. An engaging slot 451 is defined in junction of the engaging tab 45 of the top wall 41 and the connecting wall 43. Two stop plates 47 correspondingly extend from rear ends of the top wall 41 and the bottom wall 42 of each fixing arm 40.

Two pivoting portions 52 correspondingly extend down from opposite sides of a rear end of the latching member 50. A pivoting hole 523 is defined in each pivoting portion 52. Two plates 53 are formed on a bottom of the latching member 50 between the pivoting portions 52. A space 59 is defined between each pivoting portion 52 and an adjacent plate 53. Three protrusions 54 extend down from a front end of the latching member 50. The latching member 50 forms an upwardly bent latching portion 55 adjacent to the front end of the latching member 50. An abutting portion 56 extends rearward from a bottom of the latching portion 55.

The resilient member 60 is generally U-shaped, and includes two resilient arms 61 connected to each other at the base of the U-shape by a connecting arm 63. A distal end of each resilient arm 61 forms a foot 65 extending upward. A top section of each foot 65 forms an L-shaped retaining portion 653 extending toward the connecting arm 63.

A handle 71 extends from a front side of the operating member 70, with opposite ends of the handle 71 protruding outward. A plurality of positioning troughs 73 are defined in a top of the operating member 70 adjacent to the front side. A concave portion 75 is defined in a rear side of the top of the operating member 70. A slanted surface 751 is formed on a front end of the concave portion 75. Two resilient hooks 77 are correspondingly formed on opposite ends of the rear side of the operating member 70.

Figure 4:
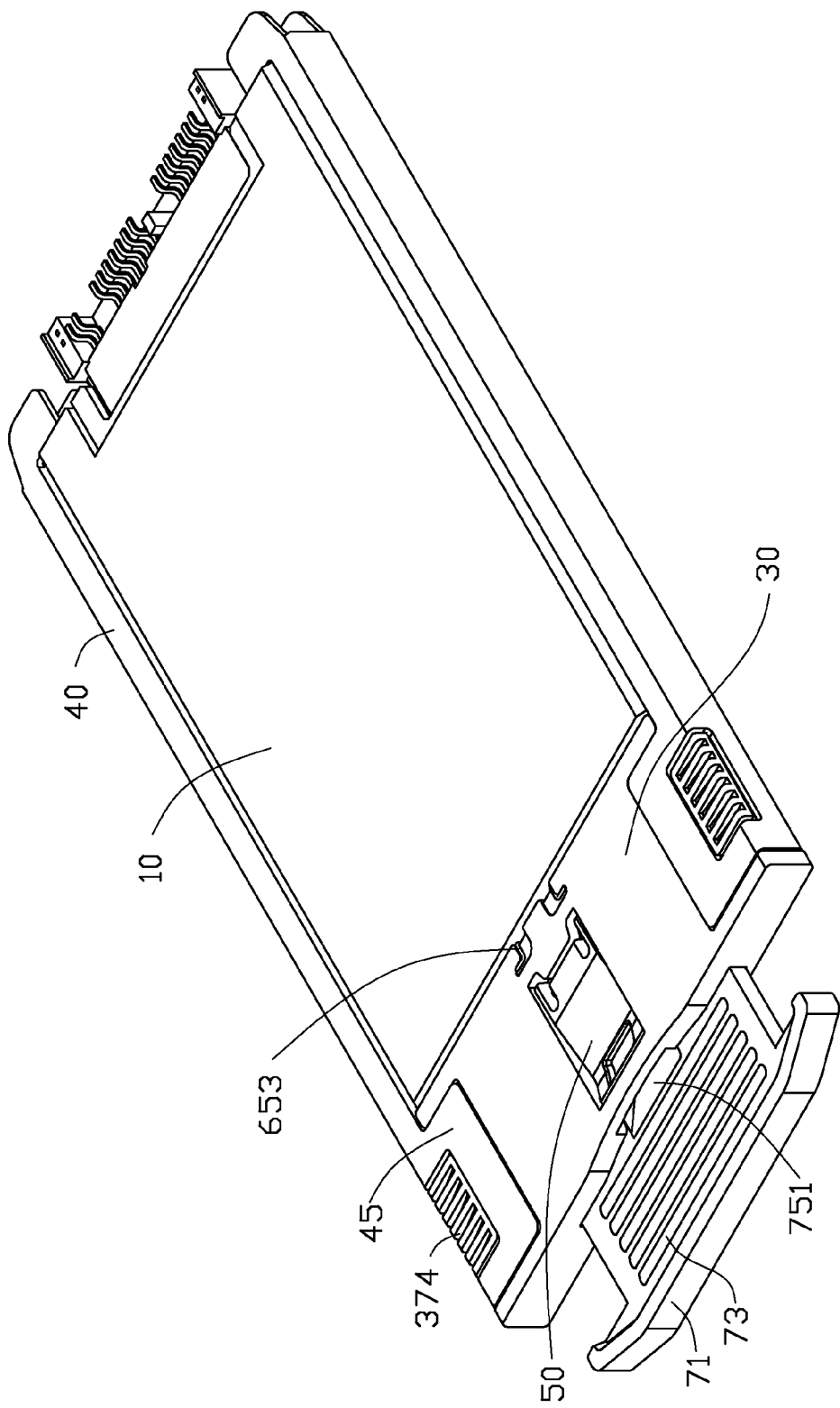
FIG. 4 is an assembled, isometric view of FIG. 2.

Referring to FIG. 4, to assemble the mounting apparatus 80, the latching member 50 is inserted into the aperture 33 of the main body 30 from the recess 31. The pivoting portions 52 are pressed towards each other, to allow the pivoting holes 523 to correspondingly engage with the pivots 334 of the main body 30. Thereby, the latching member 50 is pivotably coupled to the main body 30. The retaining portions 653 of the feet 65 of the resilient member 60 are engaged in the grooves 35 of the main body 30, respectively. The resilient arms 61 and the connecting arm 63 are arranged under the latching member 50, with the resilient arms 61 being inserted into the spaces 59, and the connecting arm 63 engaging with a top of the abutting portion 56. The resilient member 60 forces the abutting portion 56 down, and restricts the latching member 50 to be completely received in the aperture 33 and the recess 31 of the main body 30. The hooks 77 of the operating member 70 are pressed towards each other, to allow the hooks 77 to pass over the blocks 314 of the main body 30, respectively. The hooks 77 are released to engage in the sliding slots 313, respectively. Thereby, the operating member 70 is slidably coupled to the main body 30. The protrusions 54 of the latching member 50 are received in the concave portion 75 of the operating member 70. Each engaging portion 374 of the resilient tab 373 is pressed down to be inserted into a space bounded by the two engaging tabs 45 of a corresponding fixing arm 40. The engaging portions 374 are released to engage in the engaging slots 451 of the fixing arms 40, respectively. Thereby, the fixing arms 40 are fixed to the opposite ends of the main body 30.

To fix the storage device 10 to the mounting apparatus 80, one of the engaging portions 374 is pressed to be disengaged from a corresponding fixing arm 40. The corresponding fixing arm 40 is detached from the main body 30. A side of the storage device 10 is inserted into the other fixing arm 40, with the side of the storage device 10 being sandwiched between the top wall 41 and the bottom wall 42 of the other fixing arm 40, and front and rear ends of the storage device 10 engaging with the main body 30 and the stop plates 47 of the other fixing arm 40, respectively. The detached fixing arm 40 is assembled to the main body 30 again, to fix the opposite side of the storage device 10. Thereby, the storage device 10 is assembled to the mounting apparatus 80.

Figure 5:
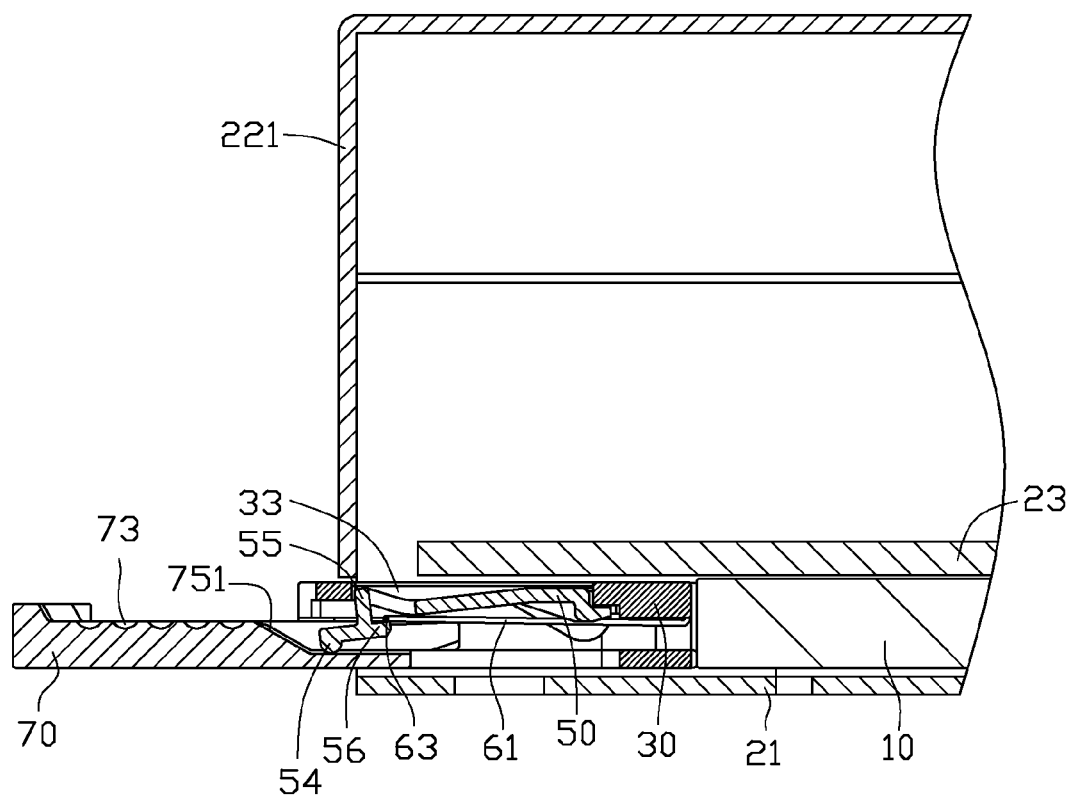
FIGS. 5 and 6 are assembled, sectional views, showing the mounting apparatus and the chassis of FIG. 1 in different states.
Figure 6:
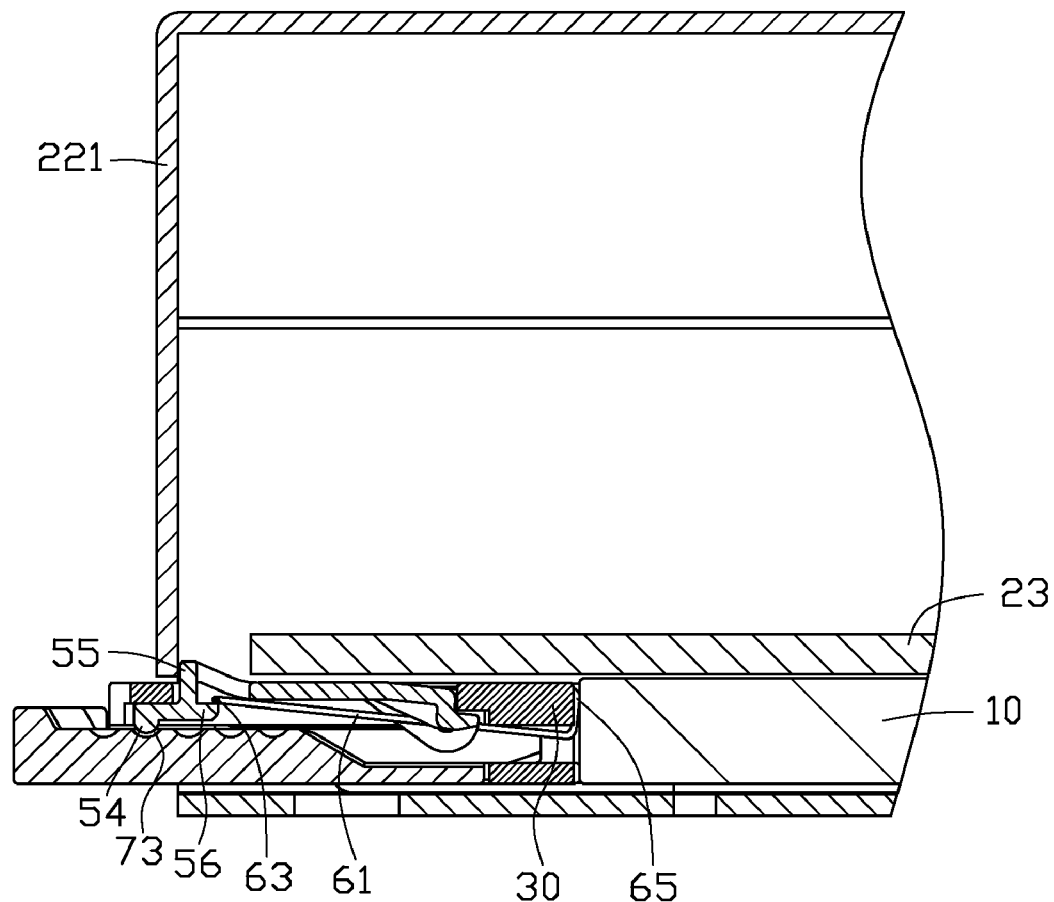

Referring to FIGS. 5 and 6, to assemble the combined assembly of the mounting apparatus 80 and the storage device 10 to the chassis 20, the mounting apparatus 80 is inserted into the chassis 20 from the opening 223 of the sidewall 221. The mounting apparatus 80 slides along the guiding plates 212, until a connector on a rear end of the storage device 10 is connected to a corresponding connector of the motherboard 23. The handle 71 of the operating member 70 is pushed towards the chassis 20. The slanted surface 751 abuts against the protrusions 54 of the latching member 50, and drives the latching member 50 to rotate upward. The resilient member 60 is deformed. The protrusions 54 pass over the slanted surface 751 to engage with a desired one of the positioning troughs 73. The latching portion 55 of the latching member 50 protrudes outwardly from the aperture 33 of the main body 30, and engages with an inside surface adjoining the opening 223 of the sidewall 221. Thereby, the mounting apparatus 80 is locked to the chassis 20.

To detach the mounting apparatus 80 from the chassis 20, the handle 71 of the operating member 70 is pulled away from the chassis 20, until the hooks 77 of the operating member 70 engage with the blocks 314, respectively. In this process, the protrusions 54 of the latching member 50 are disengaged from the positioning troughs 73; the resilient member 60 is restored to press down the abutting portion 56 of the latching member 50, and drive the latching member 50 to rotate downward. The protrusions 54 slide into the concave portion 75 along the slanted surface 751. The latching portion 55 of the latching member 50 is disengaged from the sidewall 221 of the chassis 20. The handle 71 of the operating member 70 is further pulled, and the mounting apparatus 80 together with the storage device 10 may be detached from the chassis 20.

One of the engaging portions 374 is pressed to detach the corresponding fixing arm 40 from the main body 30. Thereby, the storage device 10 can be easily detached from the mounting apparatus 80.

In another embodiment, the resilient member 60 can be omitted. A rear end of the latching member 50 is then integrally resiliently connected to a portion adjoining a rear end of the aperture 33 of the main body 30.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A mounting apparatus for fixing a storage device to a chassis, the chassis defining an opening, the mounting apparatus comprising:
   two opposite fixing arms for supporting the storage device; a main body connecting the fixing arms; a latching member pivotably received in the main body under a resilient force, the latching member comprising a latching portion; and an operating member slidably coupled to the main body, the operating member comprising a slanted surface, wherein when the mounting apparatus is received in the chassis from the opening and the operating member is pushed to be received in the main body, the slanted surface of the operating member pushes the latching member to rotate, the latching portion protrudes outwardly from the main body and engages with an inside surface adjoining the opening of the chassis, wherein a recess is defined in a bottom surface of the main body, with an end of the recess extending through a front edge of the main body, the operating member is slidably received in the recess, an aperture is defined in a top of the main body in communication with the recess, the latching member is received in the aperture, a rear end of the latching member is received in the aperture, a rear end of the latching member is pivotably coupled to a portion adjoining a rear end of the aperture of the main body, and the latching portion is upwardly bent from the latching member adjacent to a front end of the latching member, a protrusion extends down from a front end of the latching member, and a positioning trough is defined in a top of the operating member; when the operating member is pushed towards the latching member, the slanted surface of the operating member pushes the protrusion of the latching member to pass over the slanted surface and engage in the positioning trough.

2. The mounting apparatus of claim 1, wherein the operating member comprises a handle exposed out of the main body.

3. The mounting apparatus of claim 1, wherein an abutting portion extends rearward from a bottom of the latching portion, the mounting apparatus further comprises a resilient member, the resilient member comprises two resilient arms each forming a foot engaging with a rear edge of the main body, and a connecting arm connecting front ends of the resilient arms for engaging with the abutting portion.

4. The mounting apparatus of claim 1, wherein two tabs correspondingly extend down from two portions bounding the aperture of the main body adjacent to a rear end of the aperture, a pivot protrudes from each tab towards the aperture, two pivoting portions correspondingly extend down from opposite sides of a rear end of the latching member, and a pivoting hole is defined in each pivoting portion, to engage with a corresponding pivot.

5. The mounting apparatus of claim 1, wherein two opposite walls bounding the recess of the main body each define an elongated sliding slot and form a block in the sliding slot adjacent to the front edge of the main body, two resilient hooks are correspondingly formed on opposite ends of a rear side of the operating member, to slidably engage with the sliding slots.

6. The mounting apparatus of claim 1, wherein two resilient tabs are formed on opposite ends of the main body, an engaging portion extends from each of the resilient tabs, each of the fixing arms defines an engaging slot engaging with a corresponding engaging portion.

7. The mounting apparatus of claim 6, wherein two concave engaging areas are correspondingly defined in opposite ends of the main body, the resilient tabs are correspondingly formed on the engaging areas, each fixing arm comprises a top wall, a bottom wall, and a connecting wall connecting the top wall and the bottom wall, an engaging tab is formed on a front end of each of the top wall and bottom wall, for engaging with top and bottom surfaces of a corresponding engaging area, the engaging slot of each fixing arm is defined in a corresponding engaging tab.

8. The mounting apparatus of claim 7, wherein two stop plates correspondingly extend from rear ends of the top wall and the bottom wall of each fixing arm.

9. A mounting apparatus for fixing a storage device, the mounting apparatus comprising:

two opposite fixing arms for supporting the storage device; a main body connecting the fixing arms; a latching member pivotably coupled to the main body the latching member comprising a latching portion; a resilient member coupled between the latching member and the main body, the resilient member forcing the latching member to be received in the main body; and an operating member slidably coupled to the main body, the operating member comprising a slanted surface and a handle exposed out of the main body, wherein when the handle is pushed to allow the operating member to be received in the main body, the slanted surface of the operating member pushes the latching member to rotate against the resilient member, the latching portion protrudes outwardly from the main body, wherein a recess is defined in a bottom of the main body, with an end of the recess extending through a front edge of the main body, the operating member is slidably received in the recess, an aperture is defined in a top of the main body in communication with the recess, the latching member is received in the aperture, a rear end of the latching member is pivotably coupled to a portion adjoining a rear end of the aperture of the main body, and the latching portion is upwardly bent from the latching member adjacent to a front end of the latching member, wherein an abutting portion extends rearward from a bottom of the latching portion, the resilient member comprises two resilient arms each forming a foot engaging with a rear edge of the main body, and a connecting arm connecting front ends of the resilient arms for engaging with the abutting portion.

10. The mounting apparatus of claim 9, wherein a protrusion extends from the latching member, and a positioning trough is defined in the operating member, when the operating member is pushed to be received in the main body, the slanted surface of the operating member pushes the protrusion of the latching member to pass over the slanted surface and engage in the positioning trough.

11. The mounting apparatus of claim 9, wherein two tabs correspondingly extend down from two portions bounding the aperture of the main body adjacent to a rear end of the aperture, a pivot protrudes from each tab towards the aperture, two pivoting portions correspondingly extend down from opposite sides of a rear end of the latching member, and a pivoting hole is defined in each pivoting portion, to engage with a corresponding pivot.

12. The mounting apparatus of claim 9, wherein two opposite walls bounding the recess of the main body each define an elongated sliding slot and form a block in the sliding slot adjacent to the front edge of the main body, two resilient hooks are correspondingly formed opposite ends of a rear side of the operating member, to slidably engage with the sliding slots.

13. The mounting apparatus of claim 9, wherein two resilient tabs are formed on opposite ends of the main body, an engaging portion extends from each of the resilient tabs, each of the fixing arms defines an engaging slot engaging with a corresponding engaging portion.

14. A mounting apparatus for fixing a storage device to a chassis, the chassis defining an opening, the mounting apparatus comprising:

two opposite fixing arms for supporting the storage device;
a main body connecting the fixing arms;
a latching member pivotably received in the main body under a resilient force, the latching member comprising a latching portion; and
an operating member slidably coupled to the main body, the operating member comprising a slanted surface, wherein when the mounting apparatus is received in the chassis from the opening, and the operating member is pushed to be received in the main body, the slanted surface of the operating member pushes the latching member to rotate, the latching portion protrudes outwardly from the main body and engages with an inside surface adjoining the opening of the chassis, a recess is defined in a bottom surface of the main body, with an end of the recess extending through a front edge of the main body, the operating member is slidably received in the recess, an aperture is defined in a top of the main body in communication with the recess, the latching member is received in the aperture, a rear end of the latching member is pivotably coupled to a portion adjoining a rear end of the aperture of the main body, and the latching portion is upwardly bent from the latching member adjacent to a front end of the latching member, an abutting portion extends rearward from a bottom of the latching portion, the mounting apparatus further comprises a resilient member, the resilient member comprises two resilient arms each forming a foot engaging with a rear edge of the main body, and a connecting arm connecting front ends of the resilient arms for engaging with the abutting portion.

* * * * *